… 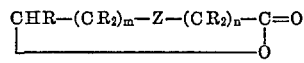

HYDROXYL-TERMINATED POLYLACTONES

Lowhardt A. A. Schoen, Geleen, Netherlands, assignor to Stamicarbon N.V., Heerlen, Netherlands
No Drawing. Filed July 14, 1972, Ser. No. 271,741
Claims priority, application Netherlands, May 22, 1971, 7110083
Int. Cl. C08g 17/17
U.S. Cl. 260—78.3 R        19 Claims

ABSTRACT OF THE DISCLOSURE

Hydroxyl-terminated polylactones can be prepared in a two-step process, the first step of which includes polymerizing monomeric lactone in the presence of a catalyst with the second step comprising reacting the resulting polylactone with a modified containing hydroxyl and/or amino groups in the presence of a catalyst. The second step can be carried out on independently produced polylactones.

---

Heretofore hydroxyl-terminated polylactone polyesters were prepared by heating a monomer lactone, or a mixture of lactones, in the presence of a catalyst and together with one or more compounds, used as initiators which contain at least two hydroxyl groups or at least two amino groups or at least one amino group and one hydroxyl group (see e.g., U.S. patent specifications 2,890,208, 3,169,945).

This known process, however, has several disadvantages. The reaction time is generally rather long; the entire reaction must be carried out with very careful exclusion of oxygen in order to avoid a discolored end-product (which is difficult to realize because of the long reaction times); and as a rule, the end-product still contains some monomer lactone and some oligomers, which have to be removed by re-purification.

Thus far, efforts to overcome these problems, which are encountered during the aforesaid preparation, have generally concentrated on a search for new catalysts.

Now, according to the present invention, it has been found that hydroxyl-terminated polylactone polyesters can be prepared in a two-step process, wherein, in the first step monomeric lactones, or mixtures thereof, are initially polymerized in the presence of a catalyst, to form an initial polylactone, and, in a second step, the thus-formed polylactones are further reacted in the presence of a catalyst and in the additional presence of a modifier compound, whereby, the product of the second step is the desired hydroxyl-terminated polylactone polyester. By means of this process, the desired polyester products of excellent quality can be obtained in relatively short times and at relatively low temperatures, and substantially at least completely free of by-product monomers and oligomers. Further, it is feasible by this process to obtain colorless polyester products even where amine compounds are used as the modifier.

A few advantages of the process according to the invention are (1) that the molecular weight of the final end-product can be controlled by the quantity of modifier employed in the second step; (2) that the reaction is fast and readily goes to completion; (3) that polylactone waste material and residues can also be processed in this way; and (4) that the reaction can be carried out at such a low temperature that the use of diamines as modifiers does not lead to discoloration of the end-product. In this way, substantially colorless hydroxyl-terminated polylactones can be readily prepared in a period as short as about 1–1.5 hours, for instance, and at a temperature as low as about 100–150° C.

As the monomeric lactone, generally, a lactone may be utilized having the formula $$CHR-(CR_2)_m-Z-(CR_2)_n-C=O$$
$$\underset{\hspace{3em}O\hspace{3em}}{\rule{8em}{0.4pt}}$$

wherein $n$ and $m$ are each integers of from 1–10; Z represents one of the linking groups —O—, —S— or —$CR_2$—; and each of R and $R_2$ may represent an alkyl-, a cycloalkyl-, an alkyloxy-, an aryl- or an alkaryl- group, or hydrogen.

A representative of such lactones are β-propriolactone, α,α-dimethyl-β-propiolactone, γ-butyrolactone, δ-valerolactone, δ-methyl-δ-valerolactone, γ,γ-dimethyl-δ-valerolactone, γ-methoxy-δ-valerolactone, ε-caprolactone, monomethyl-substituted ε-caprolactones, dimethyl-substituted ε-caprolactones, γ-cyclohexyl-ε-caprolactone, δ-methoxy-ε-caprolactone, γ-oxa-ε-caprolactone, zeta-cenantholactone, ε,δ-dimethyl-zeta-cenantholactone and ω-capryllactone.

Also, mixtures of lactones can be employed. If necessary, stabilizers can be present in the lactone or the lactone mixture. Preferably, ε-caprolactone is used as the monomer, or comonomer, since this lactone polymerizes rapidly and can be processed to stable polymers which are readily miscible with other polymers.

The initial polylactone formed in the first step is completely, or at least substantially composed of units of —O—CHR—$(CR_2)_m$—Z—$(CR_2)_n$—CO—, in which $m$ and $n$ represent integers of 1–10, Z represents an —S—, —O— or —$CR_2$-group, and each of R and $R_2$ represent an alkyl-, a cycloalkyl-, an alkyloxy-, an aryl-, or an alkaryl-group, or hydrogen.

These compounds may contain as terminal groups hydroxyl and/or carboxyl groups, or such groups blocked by esterification moieties.

As the catalyst in the polymerization step there is employed those catalysts which accelerate the polymerization of lactones. In the modification step catalysts are used which accelerate re-esterification reactions. The catalysts which are employed in the known processes may be used in both the polymerization and the modification steps.

A few examples of suitable catalysts are the oxides of zinc, lead and germanium; the alkoxides of alkali metals, alkaline earth metals, zinc, aluminum, titanium, tin, cobalt or lead, such as sodium ethoxide, aluminum trisopropylate, and magnesium aluminum ethylate; the inorganic Lewis acids, such as zinc chloride, tin dichloride, ferrichloride, aluminum chloride and barium fluoride; various lead compounds, such as lead carbamate, lead acetate and lead benzoate; organometallic compounds, like butyl lithium, triethyl magnesium, diphenyl magnesium, various tin compounds, such as dibutyl tin oxide, diethyl tin oxide, diethyl tin dichloride, tetraphenyl tin, tin diacetate, tin tetraacetate, tetrabutyl dichlorodistannoxate, hexabutyl dichlorotristannoxate; various chelate complexes of titanium, zirconium or hafnium, such as octylene glycol titanate, and zinc compounds, like zinc borate. Preferably, tin compounds are used as the catalyst and, more particularly, dibutyl tin oxide, tetrabutyl dichlorodistannoxate and hexabutyl dichlorotristannoxate. These compounds are not only extremely active but also have the advantage that they do not interfere with the processing of the hydroxyl-terminated polylactones to polyurethanes, and may even have a positive influence on the reaction with poly-isocyanates. This means that in many cases the catalyst residues need not be removed from the hydroxyl-terminated polylactone product.

Tetrabutyl dichlorodistannoxate and hexabutyl dichlorotristannoxate can be prepared in a very simple manner by stirring dibutyl tin dichloride at 25–50° C. with an excess quantity of an aqueous solution of alkali (for instance, 4 N KOH solution), filtering off the formed deposit, washing this deposit with water and drying it.

The modifier compound employed in the second step of the process, according to this invention, is a compound which contains at least two hydroxyl groups, or at least two primary or secondary amino groups, or at least one hydroxyl group and one primary or secondary amino groups, and will below be referred to simply as the modifier.

As modifiers in the process according to the invention, generally those compounds can be employed which have previously been employed as initiators in the known one-step process such as compounds of the formula X—$(CH_2)_n$—Y wherein $n$ is 2–10 and X and Y each independently represent hydroxyl or amino, polyols and polyamines.

A few examples of polyol modifiers are diols including glycols having the formula HO—$(CH_2)_n$—OH, where $n$ is an integer from 2–10; alkylene ether glycols having the formula HO—$[(CH_2)_m$—O$]_n$H  or  HO—$[CHCH_3CH_2O]_n$H where $m$ is a number of 2–5 and $n$ is a number of 2–10; 2,2-dimethyl propanediol-1,3; 3-methyl pentanediol-1,5; N-methyl diethanolamine; hydrochinol; cyclohexanediols; 4,4'-methylene biscyclohexanol; 4,4'-isopropylidene biscyclohexanol and 1,4-bishydroxy-methyl benzene. Higher functional alcohols can also be empolyed such as triols, including glycerol; trimethylolethane; hexanetriol-1,2,6 and triethanol-amine, and tetrols such as pentaerythritol. The modifier can also be a polyamine such as a diamine including those aliphatic diamines having the formulae $NH_2$—$(CH_2)_n$—$NH_2$,  $RNH$—$(CH_2)_n$—$NH_2$ or $RNH$—$(CH_2)_n$—$NHR'$ where $n$ is a number of 2–10 and R and R' represent an alkyl group, a cycloalkyl group, an aryl group or an aralkyl group. Aromatic diamines such as phenylenediamine and benzidine can also be empolyed, as well as cycloaliphatic diamines including 1,4-cyclohexanediamine and 4,4'-methylene-biscyclohexylamine. Higher functional polyamines including diethylenetriamine and aminoalcohols including aliphatic amino alcohols having the formula HO—$(CH_2)_n$—$NH_2$, where $n$ is a number of 2–10 such as N-methyl ethanolamine; isopropanolamine and p-aminophenethanol can be employed. Also, cycloaliphatic amino alcohols including 4-aminocyclohexanol can be used.

In both the initial polymerization and the modification steps the catalyst may be present in a quantity of between about 0.001 and about 1.0% by weight, based on the amount of lactone or the mixture of lactones employed in the polymerization stage and between about 0.001 and about 1% based on the amount of polyactone employed in the modification stage.

The quantity of modifier utilized can vary between about 0.1 to about 20% by weight based on the amount of initial polylactone utilized from the reaction of the first step.

The molecular weight of the end-product depends on the ratio between the quantity of modifier and the quantity of the polymer reactant. The more modifier that is added, the lower will be the molecular weight of the end-product. This method for the control of the molecular weight is a very accurate one.

With the aid of the process according to the invention hydroxyl-terminated polylactones with greatly differing molecular weights can be prepared as desired, for instance, of between 300 and 10,000. The polymers having molecular weights of between 300 and 5000 are the most suitable for further processing and application.

Use of di-functional modifiers results in products which are predominantly linear and use of tri- or polyfunctional modifiers results in branched products. Of course, mixtures of modifiers may also be employed. However, very good results are obtained by the use of simple compounds like ethylene glycol, propanediol, butanediol, ethylenediamine, aminoethanol and the like.

The use of diamines can especially lead to formation of hydroxyl-terminated polylactones which are particularly suitable for processing to polyurethanes. Because of the very mild reaction conditions at which the modification reaction can be carried out, it is possible for colorless end-products to be obtained even when diamines are employed. In conventionally known processes the use of a diamine as an initiator particularly leads in nearly all cases, to the formation of yellow- or browncolored products.

The simplest mode of realization is for quantity of catalyst to be added only once, prior to the initial polymerization step being carried out.

However, it is also possible to add a quantity of catalyst before the modification step is commenced, which catalyst, if required, may be of a type different from that utilized in the polymerization step. If necessary, it is also possible for the catalyst residues to be removed from the polylactone obtained in the initial polymerization step prior to the modification step.

If desired, after the modification reaction has ended, the product may be further purified in known ways.

The initial polymerization step may generally be carried out at temperatures of between about 25° C., or lower, and 275° C. Although it is possible to carry out the polymerization even at —50° C., one will nevertheless generally have the reaction take place at a temperature above room temperatures in order for a reasonable reaction speed to be achieved. At higher temperatures the risk of decomposition and/or discoloration of the product increases.

Preferably, the initial polymerization reaction will be carried out at a temperature between about 100° and 175° C., whereat the reaction will proceed at a suitably fast rate.

In most cases, the polymerization reaction will have substantially ended within about 5 to 15 minutes. The end-point can be determined by the presence of polylactone in which the presence of monomer is not demonstrable.

In this initial polymerization step the presence of compounds containing reactive hydrogen atoms (such as alcohols, amines, water, thiols), which adversely affect the speed of reaction, are to be avoided.

The modification step may be then carried out at temperatures of between about 50° C., or lower, and 275° C. and is, preferably, carried out at a temperature of between about 75° C. and 125° C. In most cases, the required reaction time amounts to about 15–75 minutes. The presence of oxygen during this modification reaction does not produce discoloration as soon as in the polymerization.

Both, the initial polymerization step and the modification step may be carried out in the mass or in solution or suspension. As solvents, various organic solvents and mixtures or solvents capable of dissolving the reactants and reaction products may be employed, which do not interfere with the polymerization reaction and the modification reaction. A few examples are toluene, xylenes, benzene, acetone, methylethylketone, tetrahydrofuran and dibutyl-ether.

It may be of advantage to employ a solvent which boils at the required reaction temperature. Particularly, the polymerization step is preferably carried out in solution because it will then be easy for the heat of reaction to be dissipated, and because the polyactone formed during the polymerization step is highly viscous and can be stirred only with difficulty in the absence of a solvent.

In order to minimize degradation and discoloration of the polymers, the reactions are preferably carried out with exclusion of water and oxygen. This requirement is, however, generally of a less stringent character in the modification step.

The modification reaction can be carried out using as the initial material polylactones and corresponding compounds which are completely or largely composed of units derived from the above-mentioned lactones. Preferably, poly-ε-caprolactones or copolymers of ε-caprolactones are started from.

It is noted that it is already known that hydroxyl-terminated polylactones may be converted by vacuum distillation into corresponding compounds having a higher molecular weight, which compounds by being treated with a diol in the presence of a re-esterification catalyst can again be converted into hydroxyl-terminated polylactones having a lower molecular weight (see French patent specification 2,004,564). All this forms no solution to the problem, solved by the present invention, because a hydroxyl-terminated polylactone, which is difficult to prepare by the known processes is to be utilized as the initial reactant. In this case the reaction takes 2–6 hours at 150–200° C.

It is also known that a polylactone, obtained by polymerization of lactones in the presence of water, can be esterified with a diol (see German Auslegeschrift 1936587). However, both the polymerization and the esterification reactions, which are carried out in a classic manner, last about 1–3 hours at 150° C. and do not yield complete conversion.

The principal use of the hydroxyl-terminated polylactones prepared by the invention is in their being processed to polyurethanes. Additionally, they can be used as plasticizers, lubricants, adhesives, gloss producing agents and, in general, as additives for other polymers in order to improve the properties and the processability of such other polymers.

The present invention is also advantageously directed to a method of producing a hydroxyl-terminated polylactone polyester by reacting a polylactone in the presence of a catalyst and in the additional presence of a modifier compound. The polylactone reactant can be, of course, any of those which are produced in accordance with the lactone polymerization reaction disclosed hereinabove in the two-step, polymerization - modification, reaction embodiment of the present invention. Obviously, however, polylactones prepared in accordance with conventional or known processes can also be employed. In any event, the polylactone treated as essentially free of monomeric lactone. The catalyst employed in this reaction is also essentially that described hereinbefore and the catalyst is present in amounts of about 0.001–1.0% by weight of the polylactone reactant. The modifier compound employed in this reaction is also essentially that described hereinbefore, and this modifier is generally present in amounts of about 0.1–20% by weight of the polylactone reactant.

This reaction is usually carried out at ambient pressure, at a temeprature ranging from about 50° C., or lower, to 275° C. and for a time of about 15–75 minutes. The reaction can be carried out in the mass or in solution or suspension and any of the solvents set forth above as useful in either the polymerization or modification step of applicant's two-step process can be utilized effectively.

The invention will now be elucidated with the aid of the following examples, but is in no way limited to the embodiments described in these examples.

EXAMPLE I

Preparation of hydroxyl-terminated polylactone starting from monomeric lactone.

10.6 grams of ε-caprolactone were dissolved in 38 ml. of dry xylene, the solution being heated to 100° C. under nitrogen. Subsequently, dibutyl magnesium or butyl lithium was added as catalyst.

Ten minutes after the catalyst had been added the reaction had ended, with formation of a viscous, clear solution of high-molecular weight poly-ε-caprolactone.

To this solution, ethylene glycol was added. The catalyst and amounts thereof employed were the same as that utilized in the polymerization step. After 60 minutes, at 100° C., the reaction had ended, and the resulting clear solution was poured into heptane, whereupon the end-product was isolated. The hydroxyl number and the acid number of this end-product were determined as well as those of unmodified polylactone obtained in a parallel experiment. Further, the reduced viscosity $\eta_{0.4}$ (in chloroform, at 30° C.) of the unmodified polylactone was also determined. The results are summarized in Table 1.

TABLE 1

| Catalyst | Percent by weight of monomeric lactone | Before modification (step 2) | | | After modification (step 2) | | |
|---|---|---|---|---|---|---|---|
| | | Hydroxyl number | Acid number | $\eta_{0.4}$ | Hydroxyl number | Acid number | $\overline{M}_n$ |
| Bu₂Mg | 0.5 | 5.61 | 0.17 | 0.45 | 134.64 | 0.22 | 830 |
| Bu-Li | 0.2 | 5.61 | 0.06 | 0.95 | 84.15 | 0.06 | 1,332 |

EXAMPLE 2

A high-molecular weight poly-ε-caprolactone was prepared by heating monomeric ε-caprolactone to 120° C. in the absence of water and oxygen to produce a melt. To this melt there was then added 0.5% by weight of hexabutyl dichlorotristannoxate. The resulting mixture was allowed to react while being stirred. After two minutes, the viscosity had increased to the extent that stirring was no longer possible and after 10 minutes the reaction was fully completed. The formed product had a reduced viscosity $\eta_{0.4}$ of 1.7 (in chloroform, at 30° C.), an acid number of 0.56 and a hydroxyl number of less than 5.

In a series of experiments the polylactone so obtained was modified by adding a diamine or a glycol to the melt and by allowing the resulting mixture to react in a nitrogen atmosphere at 120° C. for 60 minutes.

By pouring the melt so obtained, which melt was moderately to slightly viscous, into heptane and by filtering the resulting precipitate and drying it the end-products were isolated. The acid number and the hydroxyl number of these products were determined. Also, the percentage of extractable product (monomeric lactone plus oligomers) was determined, by extraction with water.

The results are summarized in Table 2.

TABLE 2

| Modifier | Percent by weight of polylactone | End-product hydroxyl number | Acid number | $\overline{M}_n$ | Percent extractable |
|---|---|---|---|---|---|
| Ethylene glycol | 0.62 | 11.22 | 1.12 | 8,333 | 0 |
| Ethylene diamine | 1.25 | 28.05 | 2.81 | 3,333 | 0 |
| Do | 2.05 | 39.27 | 3.37 | 2,463 | 0 |
| Do | 3.10 | 61.71 | 3.37 | 1,642 | 0 |
| Do | 6.40 | 106.59 | 4.26 | 975 | 0 |
| 1,4-butane diol | 5.30 | 44.88 | 0.56 | 2,381 | 0 |
| Do | 9.80 | 78.54 | 1.12 | 1,429 | 0 |
| Do | 12.34 | 106.59 | 0.56 | 1,042 | 0 |

EXAMPLE 3

A poly-ε-caprolactone with ester terminal groups was prepared by polymerizing ε-caprolactone in the presence of 0.5% by weight of hexabutyl dichlorotristannoxate and 0.2% by weight of ethylene glycol diacetate and thereafter removing catalyst residue from the polymer thus obtained. This polymerization reaction was carried out at a temperature of 160° C., for a period of about 300 min. The resulting polylactone product had a reduced viscosity $\eta_{0.4}$ of 1.2, a hydroxyl number of ≤0.05 and an acid number of 0.56.

This polylactone product was modified by dissolving 10.0 grams thereof in 38 ml. of dry xylene and adding to the resulting solution 1.07 grams of glycerol and 0.05 gram of hexabutyl dichlorotristannoxate. This mixture was then heated at 120° C. for 45 minutes.

After the reaction mixture had been worked up in a manner essentially as described above in Example 1, a clear-white polymer was obtained which had a hydroxyl number of 106.59 and an acid number of 0.56.

EXAMPLE 4

Poly-ε-caprolactones, sold under the trade name PCL-300 and PCL-700, by Union Carbide Corporation, were each converted into hydroxyl-terminated poly-ε-caprolactones in the following manner.

1.38 grams of ethanolamine and 0.05 gram of hexabutyl dichlorotristannoxate were added to a solution of 10 grams of said poly-ε-caprolactone in 38 ml. of dry xylene. The resulting mixture was allowed to react in a nitrogen atmosphere for 60 minutes at 120° C., with stirring. The resulting, clear solution was poured into 150 ml. of gasoline, the precipitate formed being filtered off and dried in vacuo at 30° C.

The hydroxyl number and the acid number were determined for both the initial material and the end-product, both values being expressed, as usual, in mg. equivalent KOH per gram of polymer. The results are summarized in Table 3.

TABLE 3

|  | PCL-300 | PCL-700 |
|---|---|---|
| Before modification: | | |
| Hydroxyl number | 11.22 | <5.61 |
| Acid number | 1.68 | ~1.68 |
| Molecular weight (as specified) | 15,000 | 40,000 |
| After modification: | | |
| Hydroxyl number | 89.76 | 61.71 |
| Acid number | 11.78 | 2.24 |
| Molecular weight $\bar{M}_n$ (calculated) | 1,105 | 1,695 |

EXAMPLE 5

The commercially available poly-ε-caprolactone, PCL-300, was again modified in the way described in Example 4, using as the catalyst, however, 0.5% by weight of barium-trifluoride-etherate. After having been worked up, the end-product had a hydroxyl number of 33.6, an acid number of 8.42 and a molecular weight $\bar{M}_n$ of 2667.

EXAMPLE 6

1 mole of hydroxyl-terminated poly-ε-caprolactone and 3.2 moles of 4,4'-diphenylmethane diisocyanate were dissolved in dimethyl formamide, and the mixture was heated for 1 hour at 110° C. To the resulting solution of the prepolymer so obtained 2 moles of butanediol-1,4 were added and the mixture was heated for 1.5 hours at 110° C. From the 30% solution of polyurethane in dimethyl formamide obtained in this way, small plates having a thickness of 1.5 mm. and sheeting having a thickness of 0.2 mm. were made, which products were fully transparent. A number of mechanical properties of these plates and sheetings were determined.

As hydroxyl-terminated polylactones a few products obtained in Example 2 were used, notably:

A: Polycaprolactone, modified with 1,4-butanediol, $\bar{M}_n$ 1042

B: Polycaprolactone, modified with 1,4-butanediol, $\bar{M}_n$ 1429

C: Polycaprolactone, modified with 1,4-butanediol, $\bar{M}_n$ 2381

The results are summarized in Table 4, below.

TABLE 4

| Hydroxyl-terminated polylactone | A | B | C |
|---|---|---|---|
| Shore hardness: | | | |
| A max | 94 | 86 | 95 |
| A after 15 sec | 90 | 84 | 90 |
| D max | 40 | 37 | 39 |
| D after 15 sec | 34 | 32 | 32 |
| E-modulus (kg./cm.²): | | | |
| At 100% elongation | 119±3 | 59±5 | 64±2 |
| 200% | 184±8 | 95±4 | 72±2 |
| 300% | 340±20 | 180±2 | 110±7 |
| Breaking strength in kg./cm.² | 410±30 | 350±30 | 270±25 |
| Elongation in percent | 370±20 | 515±12 | 675±10 |
| Tear strength in kg | 22.5±2.0 | 30±2.0 | 22±2.0 |

EXAMPLE 7

In essentially the same manner as described in Example 6, polyurethane sheeting was prepared, this time using, however, hydroxyl-terminated poly-ε-caprolactones prepared with ethylene diamine as the modifier.

D: $\bar{M}_n$ 2463, thickness of the sheeting 0.014 cm.
E: $\bar{M}_n$ 975, thickness of the sheeting 0.020 cm.
F: $\bar{M}_n$ 553, thickness of the sheeting 0.012 cm.

The results are summarized below in Table 5.

TABLE 5

| Hydroxyl-terminated polylactone | D | E | F |
|---|---|---|---|
| E-modulus (kg./cm.²): | | | |
| At 100% | 300±50 | 53±7 | 115±25 |
| At 200% | 460±80 | 97±12 | 160±30 |
| At 300% |  | 119±7 |  |
| Breaking strength, kg./cm.² | 470±70 | 275±25 | 195±30 |
| Elongation in percent | 206 | 375±25 | 260±20 |
| Tear strength in kg | 50±7 | 14.0±2 | 28±7 |

What is claimed is:

1. A process for preparing a hydroxyl-terminated polylactone comprising in a first step polymerizing monomeric lactone in the presence of a catalyst at temperature up to about 275° C., said catalyst being present in amounts of about 0.001–1 percent by weight of said monomeric lactone so as to produce polymeric lactone, and in a second step, reacting the resulting polymeric lactone, essentially free of lactone monomer, with a modifier containing (a) at least two hydroxyl groups or (b) at least two primary or secondary amino groups or (c) at least one hydroxyl and one primary or secondary amino groups in the presence of a catalyst at a temperature of about 50–275° C. to produce said hydroxyl-terminated polylactone, said modifier being present in amounts of about 0.1–20 percent by weight of said polymeric lactone and said catalyst being present in amounts of about 0.001–1 percent by weight of said polymeric lactone and wherein the molecular weight of said polymeric lactone is such that the molecular weight of said hydroxyl-terminated polylactone is between 300 and 10,000.

2. The process of claim 1 wherein monomeric lactone is polymerized in said first step in the presence of an inert solvent.

3. The process of claim 1 wherein said monomeric lactone comprises ε-caprolactone.

4. The process of claim 1 wherein the resulting hydroxyl-terminated polylactone has a molecular weight ranging from about 500–5,000.

5. The process of claim 1 wherein said modifier is a polyol selected from the group consisting of
   (a) a polyol of the formula HO—$(CH_2)_n$—OH wherein n is 2–10,
   (b) a polyol of the formula

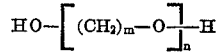

wherein m is 2–5 and n is 2–10, and
   (c) a polyol of the formula HO—$[CHCH_3CH_2O]_nH$ wherein n is 2–10.

6. The process of claim 1 wherein said modifier is a polyamine selected from the group consisting of
   (a) a polyamine of the formula $NH_2$—$(CH_2)_n$—$NH_2$ wherein n is 2–10,
   (b) a polyamine of the formula RNH—$(CH_2)_n$—$NH_2$ wherein n is 2–10 and R is selected from the group consisting of alkyl, cycloalkyl, aryl and aralkyl, and
   (c) a polyamine of the formula RNH—$(CH_2)_n$—NHR' wherein n is 2–10 and R and R' each independently represent a member selected from the group consisting alkyl, cycloalkyl, aryl and aralkyl.

7. The process of claim 1 wherein said modifier has the formula X—(CH$_2$)$_n$—Y wherein $n$ is 2–10 and X and Y each independently represent a member selected from the group consisting of hydroxyl and amino.

8. The process of claim 1 wherein said catalyst is selected from the group consisting of dibutyl tin oxide, tetrabutyl dichlorodistannoxate and hexabutyl dichlorotristannoxate.

9. The process of claim 1 wherein the first step polymerization reaction is carried out at a temperature between about 100–175° C. for a period of about 5–15 minutes, and the second step modification reaction is carried out at a temperature between about 75–125° C. for a period of about 15–75 minutes.

10. The process of claim 1 wherein said monomeric lactone has the formula

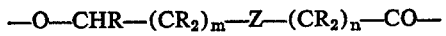

wherein $m$ and $n$ are each 1–10; Z is a link selected from the group consisting of —O—, —S— and —CR$_2$—; and R and R$_2$ each independently represent a member selected from the group consisting of alkyl, cycloalkyl, alkoxyalkyl, aryl, alkaryl and hydrogen.

11. The process of claim 1 wherein said polymeric lactone has repeating units of the formula —O—CHR—(CR$_2$)$_m$—Z—(CR$_2$)$_n$—CO— wherein $m$ and $n$ are each 1–10; Z is a link selected from the group consisting of —S—, —O— and —CR$_2$— and R and R$_2$ each independently represent a member selected from the group consisting of alkyl, cycloalkyl, alkoxyalkyl, aryl, alkaryl and hydrogen.

12. A process for preparing a hydroxyl-terminated polylactone comprising reacting polymeric lactone essentially free of lactone monomer in the presence of a catalyst with a modifier containing (a) at least two hydroxyl groups, or (b) at least two primary or secondary amino groups or (c) at least one hydroxyl and one primary or secondary amino groups, at a temperature of about 50–275° C., said modifier being present in amounts of about 0.1–20 percent by weight of said polymeric lactone and said catalyst being present in amounts of about 0.001–1 percent by weight of said polymeric lactone and wherein the molecular weight of said polymeric lactone is such that the molecular weight of said hydroxyl-terminated polylactone is between 300 and 10,000.

13. The process of claim 12 wherein the resulting hydroxyl-terminated polylactone has a molecular weight ranging from about 500–5,000.

14. The process of claim 12 wherein said modifier is a polyol selected from the group consisting of
(a) a polyol of the formula HO—(CH$_2$)$_n$—OH wherein $n$ is 2–10,
(b) a polyol of the formula

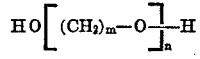

wherein $m$ is 2–5 and $n$ is 2–10, and
(c) a polyol of the formula HO—[CHCH$_3$CH$_2$O]$_n$H wherein $n$ is 2–10.

15. The process of claim 12 wherein said modifier is a polyamine selected from the group consisting of
(a) a polyamine of the formula NH$_2$—(CH$_2$)$_n$—NH$_2$ wherein $n$ is 2–10,
(b) a polyamine of the formula RNH—(CH$_2$)$_n$—NH$_2$ wherein $n$ is 2–10 and R is selected from the group consisting of alkyl, cycloalkyl, aryl and aralkyl, and
(c) a polyamine of the formula RNH—(CH$_2$)$_n$—NHR' wherein $n$ is 2–10 and R and R' each independently represent a member selected from the group consisting of alkyl, cycloalkyl, aryl and aralkyl.

16. The process of claim 12 wherein said modifier has the formula X—(CH$_2$)$_n$—Y wherein $n$ is 2–10 and X and Y each independently represent a member selected from the group consisting of hydroxyl and amino.

17. The process of claim 12 wherein said catalyst is selected from the group consisting of dibutyl tin oxide, tetrabutyl dichlorodistannoxate and hexabutyl dichlorotristannoxate.

18. The process of claim 12 wherein said reaction is carried out at a temperature between about 75–125° C. for a period of about 15–75 minutes.

19. The process of claim 12 wherein said polymeric lactone has repeating units of the formula —O—CHR—(CR$_2$)$_m$—Z—(CR$_2$)$_n$—CO— wherein $m$ and $n$ are each 1–10; Z is a link selected from the group consisting of —S—, —O— and —CR$_2$— and R and R$_2$ each independently represent a member selected from the group consisting of alkyl, cycloalkyl, alkoxyalkyl, aryl, alkaryl and hydrogen.

References Cited
UNITED STATES PATENTS

| | | | |
|---|---|---|---|
| 2,890,208 | 6/1959 | Young et al. | 260—78.3 |
| 2,933,477 | 4/1960 | Mostettler | 260—78.3 |
| 3,259,607 | 7/1966 | Cherdron et al. | 260—78.3 |
| 3,284,417 | 11/1966 | Mostettler et al. | 260—78.3 |
| 3,471,456 | 10/1969 | Klootwijk | 260—78.3 |

FOREIGN PATENTS

| | | | |
|---|---|---|---|
| 1,231,163 | 9/1960 | France | 260—78.3 |
| 2,026,220 | 9/1970 | France | 260—78.3 |

OTHER REFERENCES

Marvel: "An Introduction to the Chemistry of High Polymers," pp. 11–13, Wiley, 1959.

HAROLD D. ANDERSON, Primary Examiner

E. A. NIELSEN, Assistant Examiner

U.S. Cl. X.R.

260—77.5 AN, 484 A

UNITED STATES PATENT OFFICE
CERTIFICATE OF CORRECTION

Patent No. 3,806,495　　　　　　　Dated April 23, 1974

Inventor(s) Lowhardt A.A. Schoen

It is certified that error appears in the above-identified patent and that said Letters Patent are hereby corrected as shown below:

Column 1, line 6, the filing date of Netherlands application 7110083 is stated as "May 22, 1971". This should read --July 22, 1971--.

Signed and sealed this 18th day of February 1975.

(SEAL)
Attest:

RUTH C. MASON
Attesting Officer

C. MARSHALL DANN
Commissioner of Patents
and Trademarks